J. G. Tibbets,
Bridle,
N° 2,285. Patented Oct. 9, 1841.

UNITED STATES PATENT OFFICE.

JOHN G. TIBBETS, OF NEW YORK, N. Y.

CONSTRUCTION OF THE BLINDS OF HORSE-BRIDLES.

Specification of Letters Patent No. 2,285, dated October 9, 1841.

*To all whom it may concern:*

Be it known that I, JOHN G. TIBBETS, of the city, county, and State of New York, have invented a new and useful Improvement in Blinds for Bridles of Horses, which is described as follows, reference being had to annexed drawings of the same, making part of this specification.

Figures 4, 5:
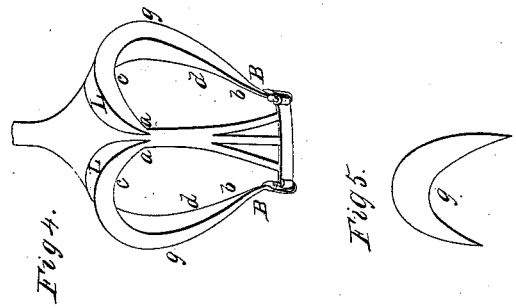
Figure 1:
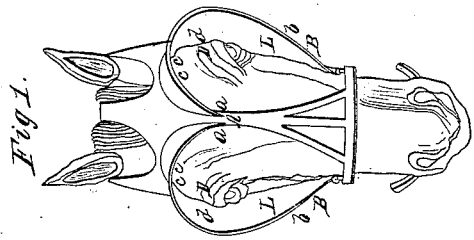
Figure 3:
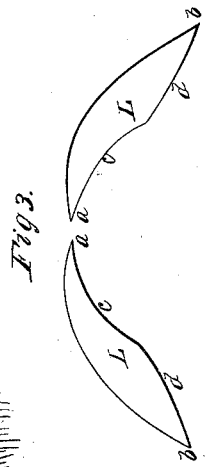
Figure 2:
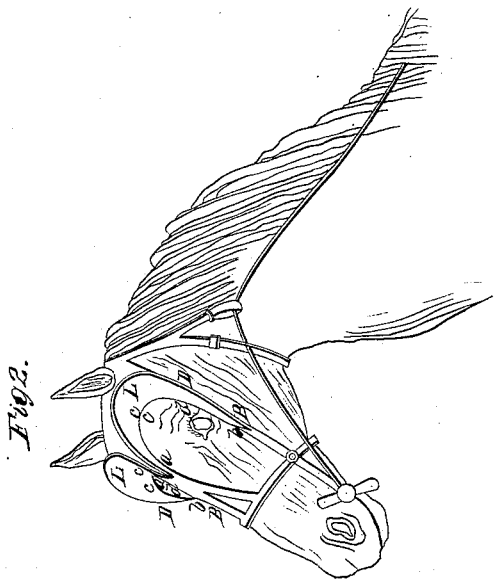

Figure 1 is a front view of the head-stall and blinds. Fig. 2 is a three-fourths view; Fig. 3, the pieces of leather to form the blinds. Fig. 4 represents the blinds constructed with wings to prevent the animal from seeing laterally. Fig. 5 the flange detached.

Similar letters refer to corresponding parts.

The nature of this invention and improvement is to construct the bridle with leather arch blinds nearly encircling the eyes, projecting forward and spreading outward in such a manner as not to chafe or heat the eyes and exclude the air and torture the animal and eventually cause him to become partially, or entirely, blind, but to allow the eyes to be entirely free, cool, and open to an unobstructed circulation of the air around them and to a direct view forward and laterally of objects in their natural light and form and at the same time prevent him from seeing what is going on behind, or over him, and thus prevent him from taking fright from these causes and suffering the evils complained of, said blinds being susceptible of an addition, or wing, placed at right angles thereto for the purpose of preventing the animal seeing to the right or left, said improvement being applicable to the bridles of carriage as well as saddle horses.

These blinds are made by taking two pieces of leather L of a proper kind for such purpose and bringing them to the form of a segment of a circle, having the cord line of the arc made concavo-convex or serpentine as at c, d, Fig. 3, so as to correspond with the acquired position of the check straps, face piece, and brow band of the bridle, to which the arched blinds are sewed, caused by the protuberances and depressions of the head of the horse when the bridle is put on the ends or points a, a, of the said blinds being brought together and sewed to the middle of the face piece A of the bridle A, while the ends b, b, are sewed to the checks B at B and the concavity c to the brow band c at c and the convexity d to the checks at D, which arrangement will cause the said pieces of leather to flare outward from the horse's head and incline forward and form a complete arch over the horse's eye and not only prevent him from seeing what is going on behind or over him, but also to gather in the air around the eye to keep it cool and to leave his vision unobstructed forward and laterally and do away with the usual covering which tends so much to injure the animal's head.

In cases where it is required to prevent the animal from seeing to the right or left as well as backward and upward a wing or flange g, Figs. 4 and 5 of the crescent form must be secured to the blind at right angles thereto, or at any required angle around the outer edge thereof in such a manner as to project forward toward the face of the animal thereby obstructing his vision laterally. This flange or wing should be secured to the blind in the manner represented at g, Fig. 4.

There are other advantages to be derived from the use of the before described blinds, but those before mentioned will suffice to show their utility. These blinds may also be made square or angular instead of arching, or in the manner of a hood if preferred.

What I claim as my invention and which I desire to secure by Letters Patent is—

The before-described mode of constructing bridle blinds arching over the eyes and flaring outward and forward in combination with the flanges or wings in the manner and for the purpose herein set forth.

JOHN G. TIBBETS.

Witnesses:
NATHL. P. LABARTE,
JAMES GRALEY.